United States Patent [19]

Baumbach

[11] 4,314,302

[45] Feb. 2, 1982

[54] COMMUNICATIONS CIRCUIT LINE PROTECTOR AND METHOD OF MAKING THE SAME

[75] Inventor: Bertram W. Baumbach, Arlington Heights, Ill.

[73] Assignee: Reliable Electric Company, Franklin Park, Ill.

[21] Appl. No.: 141,290

[22] Filed: Apr. 18, 1980

[51] Int. Cl.[3] .............................................. H02H 3/22

[52] U.S. Cl. .................................... 361/119; 361/120

[58] Field of Search ................ 361/119, 120, 124, 117

[56] References Cited

U.S. PATENT DOCUMENTS 3,849,750 11/1974 Baumbach et al. ............. 361/119 X 4,208,694 6/1980 Gilberts .............................. 361/119

*Primary Examiner*—J. D. Miller

*Assistant Examiner*—Reinhard J. Eisenzopf

*Attorney, Agent, or Firm*—Trexler, Bushnell & Wolters, Ltd.

[57] ABSTRACT

A line protector for a communications circuit provides a gas tube surge voltage arrester for primary surge protection and a back up air gap arrester for secondary protection in the event of venting of the gas tube. The gas tube is housed in a metallic tubular element that forms one electrode at the air gap, the other electrode at the air gap be provided by the rim of one of the gas tube electrodes. The tubular element is initially formed of circular cross section, then deformed to an oval cross section to be dimensioned to provide engagements across the minor diameter of the oval with the gas tube when the latter is telescoped therewith. The fit provided by the aforesaid engagement establishes the correct air gap width.

6 Claims, 6 Drawing Figures

FIG. 1
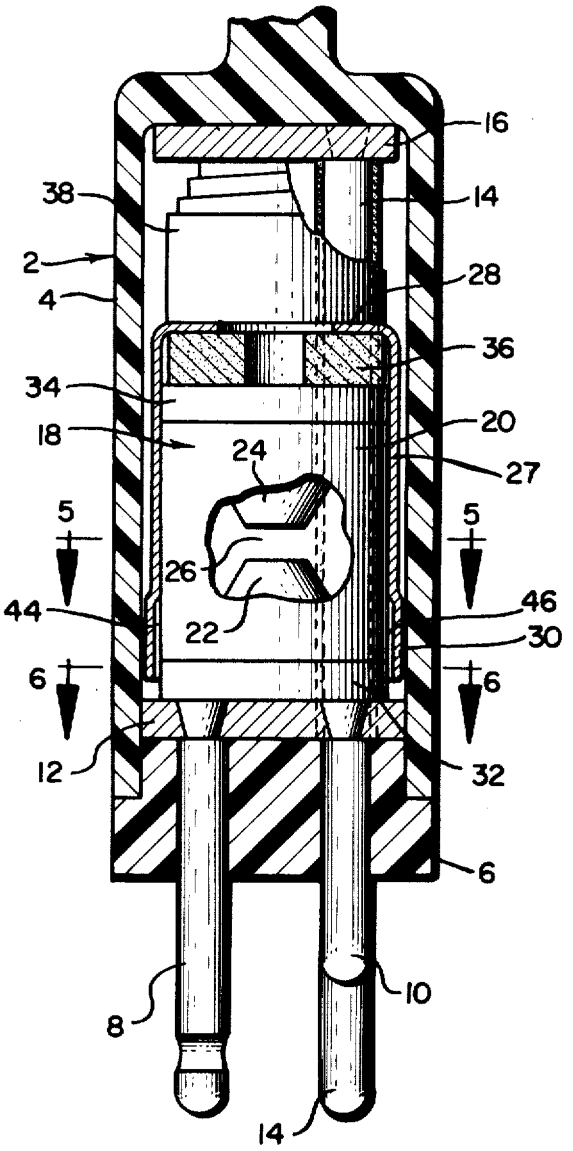
FIG. 2
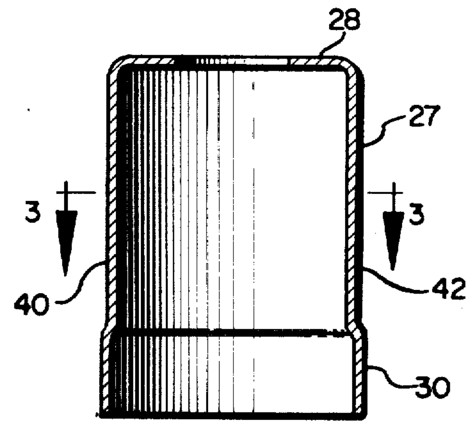
FIG. 3
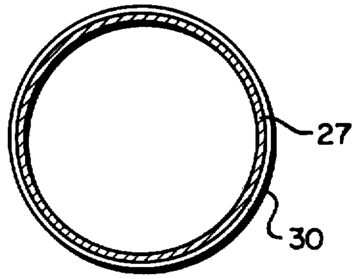
FIG. 4
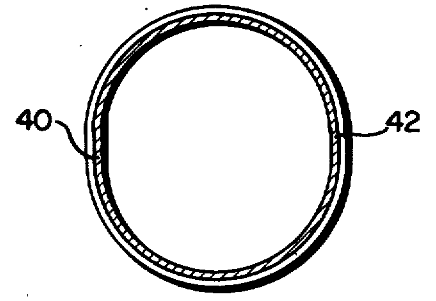
FIG. 5
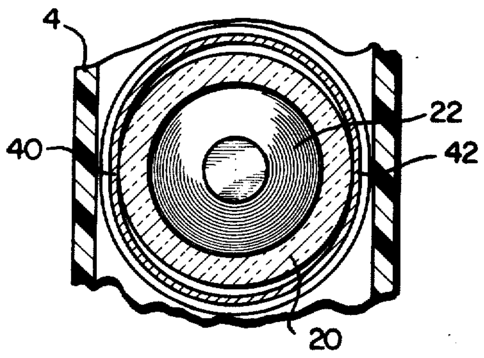
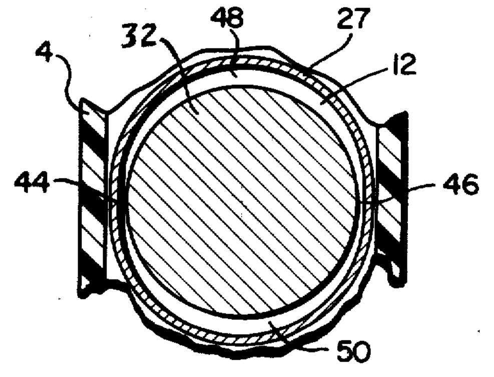
FIG. 6

COMMUNICATIONS CIRCUIT LINE PROTECTOR AND METHOD OF MAKING THE SAME

BACKGROUND OF THE INVENTION

This invention relates to line protectors for telephone and like communications circuits and to methods of making such protectors. The line protectors with which the present invention is concerned are of the type known generally as central office protectors and are utilized to prevent inside plant or central office equipment from damage due to overvoltage or overcurrent faults on incoming lines.

In order to comply with modern standards of line protection, it is becoming common to design line protectors with back-up surge voltage protection. Where gas tube surge voltage arresters are utilized in the protector, it is realized that occasionally a gas tube will be defective by being vented to atmosphere. Under such conditions the arc gap within the tube is usually too wide to be effective for surge voltage protection. Often the electrode gap in the gas tube is of the order of 0.030 to 0.040" and may have a voltage breakdown of several hundred volts when the gas tube is functioning properly. However, when the tube is vented to atmosphere the breakdown voltage may be of the order of several thousand volts. This voltage is much too high for satisfactory protection. As a result, back up air gaps external to the gas tube are being designed into the protector modules, and these air gaps are generally designed to break down in the order of 1000 volts or less. Such air gaps require a gap spacing of only a few thousandths of an inch, for example in the order of 0.0065" to 0.0075" for air gap between metal electrodes.

In the mass production of protector modules it is important that the secondary air gaps be accurately established, i.e. that the spacing of the electrode elements forming the secondary air gap are not too widely or too narrowly separated. Accordingly, with normal manufacturing tolerances it sometimes is a problem assuring that the secondary air gap is always within specified tolerances.

OBJECTS AND SUMMARY OF THE INVENTION

An object of this invention is to provide a line protector in which the accuracy of the secondary air gap is established with considerable reliability.

A further object of this invention is to provide an improved protector module that uses a number of standard features while at the same time assuring the accuracy of the secondary air gap.

A further object of this invention is to provide a simple method of producing the line protector which assures the accuracy of the secondary air gap.

In accordance with the foregoing objects the present invention comprises a line protector for a communications circuit comprising a gas tube surge voltage arrester having a central axis and opposed electrodes spaced apart by a tubular insulator to define a primary arc gap, means forming a first circuit for electrically connecting one of the electrodes to ground, means forming a second circuit for electrically connecting the other electrode to a communications line, the first circuit including a tubular element surrounding said gas tube, said tubular element having a skirt portion that surrounds said other electrode in spaced relation thereto to define a secondary arc gap having a breakdown voltage that is greater than the breakdown voltage of the primary arc gap but less than that of the primary arc gap should the gas tube become vented, said tubular element being resilient and by its resiliency engaging said gas tube at first and second spaced regions on opposite sides of said central axis so that the gas tube and the tubular element are prevented from radial movement relative to each other to establish and maintain said secondary arc gap.

In the preferred form of the invention the tubular element is a cup-like member which is oval shaped in cross-section and the gas tube is circular in cross section so that the first and second regions are diametrally opposed. The insulator and the tubular element are spaced apart at opposed third and fourth regions which are intermediate the respective first and second regions.

The invention further provides a method of making a line protector for a communications circuit that includes a gas tube surge voltage arrester having opposed electrodes separated by a tubular insulator of circular cross section to define a primary arc gap and in which a secondary arc gap outside of the gas tube is established between one of said electrodes and a resilient tubular element that surrounds the insulator and said one electrode, said method comprising forming said tubular element as a structure of circular cross section with a skirt portion of enlarged diameter at an end thereof, applying pressure to first and second regions of said tubular element on opposite sides of its central axis to deform said structure into an oval shape having a minimum internal diameter less than the outer diameter of the insulator, inserting said gas tube into said oval shape so that the insulator slightly expands said minimum diameter to leave said oval shape in pressure engagement with said gas tube at said first and second regions, and relatively axially positioning said gas tube and tubular element so that said shirt surrounds said one electrode with clearance therebetween to establish and maintain said secondary gap at a predetermined width by preventing relative radial movement between the tubular element and the gas tube due to said pressure engagement at said regions.

BRIEF DESCRIPTION OF THE FIGURES

FIG. 1 is a longitudinal cross sectional view of a line protector constructed in accordance with and embodying the present invention;

FIG. 2 is a sectional view through the central axis of the tubular element which forms part of the present invention;

FIG. 3 is a sectional view taken along lines 3—3 of FIG. 2;

FIG. 4 is a sectional view similar to FIG. 3 but showing the tubular element after it has been deformed into an oval shape pursuant to the method of this invention;

FIG. 5 is a fragmentary sectional view taken approximately along line 5—5 of FIG. 1; and FIG. 6 is a fragmentary sectional view taken approximately along line 6—6 of FIG. 1.

DETAILED DESCRIPTION

Referring now in more detail to the drawings, FIG. 1 shows a cross sectional view of one-half of a dual line protector module. By a dual module it is meant that there is separate surge protection for each side of the line, namely for the tip side and the ring side of the line.

Since both halves of the protector module are the same, only one such half need be shown and described herein.

The protector module 2 comprises a plastic dielectric housing 4 that telescopes with and joins a plastic dielectric base 6 in a conventional manner. Mounted in the base 6 is a long line pin 8 to which an outside line is connected (tip or ring), and a short line pin 10 connected to the inside central office equipment. To provide conductive connection between the line pins 8, 10 the inside surface of the base 6 has a metallic plate 12 that is secured to the base 6 in any conventional manner. One such manner is through the staking of the line pins to the plate 12. The lines pins 8, 10 project through the base 6 and are adapted to be plugged into a conventional connector panel.

In addition to the line pins 8, 10 there is a ground pin 14 that also projects through the base 6 for plug-in connection to a ground terminal in the connector panel. Within the housing 4 the ground pin 14 is suitably insulated and extends to a region adjacent to the end wall of the housing for connection to a ground plate 16. This ground plate 16 as well as the ground pin 14 may be of the general configuration shown in U.S. Pat. No. 3,849,750 that issued Nov. 19, 1974, and to which reference may be had.

Positioned within the interior of the housing 4 is a gas tube surge voltage arrester 18 of circular cross section having a tubular ceramic insulator 20 that separates two opposed electrodes 22, 24. The gas tube contains conventional inert gas, e.g. argon, etc. These electrodes define a primary arc gap 26 having a breakdown voltage of the order of several hundred volts, and the gap 26 may be in the order of 0.030 to 0.040 inches in width. The gas tube arrester 18 is received within a metallic tubular element 27 having a perforated end wall 28 and an outwardly flared skirt portion 30 of enlarged diameter. As will be described hereafter, the skirt 30 is in close proximity with the rim 32 of the electrode 22, and the rim 32 and the skirt 30 define a secondary or back up arc gap that is intended to provide overvoltage protection for the line in the event that the inert gas in the tube 18 becomes vented to atmosphere. The electrode rim 32 engages the metal plate 12 to form a circuit for electrically connecting the electrode 22 to the line pins 8, 10.

Interposed between the rim 34 of the electrode 24 and the end wall 28 is a perforated solder element in the form of a disc 36. Interposed between the ground plate 16 and the end wall 28 is a volute spring 38 of known construction. There is thus provided a direct metallic path from the electrode 24 to the ground pin 14 through the tubular element 27, the volute spring 38 and the ground plate 16. Normal overvoltage protection is provided by a discharge across the gap 26 to ground when an overvoltage surge appears at either line pin 8, 10. If the gas tube becomes overheated due to an excessive arcing across gap 26 and resultant current flow from the line pins to ground pin 14, the solder element 36 will melt causing the volute spring 38 to move the tubular element 27 and its skirt 30 into the engagement with the metal plate 12, thereby grounding the line.

An important feature of this invention is the provision of accurately and consistently establishing the magnitude of a secondary arc gap between the electrode rim 32 and the skirt 30. By way of example but not of limitation, the secondary or back up arc gap between the rim 32 and the skirt 30 should be from about 0.0065 inches to about 0.0075 inches (nominal gap 0.007 inches) resulting in an arc gap with a breakdown voltage of about 1000 volts.

Initially the tubular element 27 is drawn from sheet metal stock to the shape shown in FIGS. 2 and 3, namely wherein the tubular element 27 is of circular cross section with the flared out skirt 30. The internal diameter of the tubular element axially between the skirt 30 and the end wall 34 is slightly larger than the external diameter of the gas tube 18. After forming the tubular element 27 and before applying the conventional plating thereto, a secondary forming operation is performed to change the cross section of the tubular element 27 to the elliptical configuration shown in FIG. 4. For this purpose inward radial pressure is applied by a blunt forming tool to first and second regions 40 and 42 that are diametrally opposed, namely on opposite sides of the central axis of the tubular element 27 and spaced from the skirt 30. This deforming operation reshapes the tubular element into an elliptical shape by cold working the resilient tubular element 27 beyond its elastic limits, but while still retaining resiliency in the regions 40, 42. The minor diameter of the ellipse across the portions 40, 42 axially intermediate the skirt 30 and the end wall 34 is smaller than the external diameter of the gas tube 18. Consequently, when the gas tube is inserted telescopically within the tubular element 27, the oval shape of the elliptical form expands slightly to leave the oval shape in resilient pressure engagement with the gas tube in the regions 40, 42. By this positive contact between the tubular element 27 and the gas tube, two opposed gaps 44, 46 (FIG. 6) are established at the diametrally opposed narrower regions between the skirt 30 and the electrode rim 32. Regions of clearance 48, 50 between the gas tube 18 and the tubular element 27 are across the major diameter of the ellipse. These arc gaps 44, 46 are, therefore, axially in line with the regions 40, 42. The secondary or back up gap of a nominal 0.007 inches will be at one or both of the gaps 44, 46. Either gap 44, 46 may be the place of discharge.

The invention is claimed as follows:

1. A line protector for a communications circuit comprising a gas tube surge voltage arrester having a central axis and opposed electrodes spaced apart by a tubular insulator to define a primary arc gap, means forming a first circuit for electrically connecting one of the electrodes to ground, means forming a second circuit for electrically connecting the other electrode to a communications line, the first circuit including a tubular element surrounding said insulator, said tubular element having a skirt portion that surrounds said other electrode in spaced relation thereto to define therewith a secondary arc gap having a breakdown voltage that is greater than the breakdown voltage of the primary arc gap but less than that of the primary arc gap should the gas tube become vented, said tubular element having a non-circular cross section and being resilient and by its resiliency engaging said gas tube at localized first and second spaced regions on opposite sides of said central axis so that the gas tube and the tubular element are prevented from radial movement relative to each other to establish and maintain said secondary arc gap at a localized region that is at a minimum spacing between said skirt portion and said other electrode.

2. A line protector according to claim 1 in which said tubular element is oval shaped in cross section and said gas tube is circular in cross section whereby the gas tube and tubular element are spaced at opposite third and fourth regions.

3. A line protector according to claim 1 or claim 2 in which said skirt portion is oval shaped in cross section.

4. A method of making a line protector for a communications circuit that includes a gas tube surge voltage arrester having opposed electrodes separated by a tubular insulator of circular cross section to define a primary arc gap and in which a secondary arc gap outside of the gas tube is established between one of said electrodes and a resilient tubular element that surrounds the insulator and said one electrode, said method comprising forming said tubular element as a structure of circular cross section with a skirt portion of enlarged diameter at an end thereof, applying pressure to first and second regions of said tubular element on opposite sides of its central axis to deform said structure into an oval shape having a minimum internal diameter less than the outer diameter of the gas tube, inserting said gas tube into said oval shape so that the gas tube slightly expands said minimum diameter to leave said oval shape in pressure engagement with said gas tube at said first and second regions, and relatively axially positioning said gas tube and tubular element so that said skirt surrounds said one electrode with clearance therebetween to establish and maintain said secondary gap at a predetermined width by preventing relative radial movement between the tubular element and the gas tube due to said pressure engagements at said regions.

5. A method according to claim 4 in which said first and second regions are substantially at opposite ends of a diameter through said circular cross section and said regions are axially spaced from said skirt portion.

6. A method according to claim 4 in which the formed oval shape is such as to produce clearance at opposed third and fourth regions.

* * * * *